United States Patent

Pfeifer et al.

[11] 4,210,742
[45] Jul. 1, 1980

[54] TRANSPARENT POLYAMIDES FROM BRANCHED CHAIN DIAMINE

[75] Inventors: Josef Pfeifer, Therwil; Heinz Peter, Rheinfelden, both of Switzerland

[73] Assignee: Ciba-Geigy Corporation, Ardsley, N.Y.

[21] Appl. No.: 954,810

[22] Filed: Oct. 26, 1978

[30] Foreign Application Priority Data

Oct. 28, 1977 [CH] Switzerland ............. 13145/77

[51] Int. Cl.² ............................................. C08G 69/26
[52] U.S. Cl. ................................... 528/346; 260/33.4 R; 528/336; 528/339; 528/347; 528/349
[58] Field of Search ............... 528/349, 348, 339, 346

[56] References Cited

U.S. PATENT DOCUMENTS

| 3,563,959 | 2/1971 | Schade et al. ............ 528/349 |
| 3,939,147 | 2/1976 | Hugelin et al. ........... 260/239 BC |

FOREIGN PATENT DOCUMENTS

| 905475 | 9/1962 | United Kingdom . |
| 948189 | 1/1964 | United Kingdom . |
| 1251520 | 10/1971 | United Kingdom . |
| 1353091 | 5/1974 | United Kingdom . |

OTHER PUBLICATIONS

Chemical Abstracts, vol. 40, 900² (1946).
Chemical Abstracts, vol. 36 (1942), 4720⁴.

Primary Examiner—Harold D. Anderson
Attorney, Agent, or Firm—Luther A. R. Hall

[57] ABSTRACT

The transparent polyamides of the invention have a reduced specific viscosity of at least 0.4 dl/g (0.5% solution of the polyamide in m-cresol at 25° C.) and consist either of (a) recurring structural units of the formula (I)

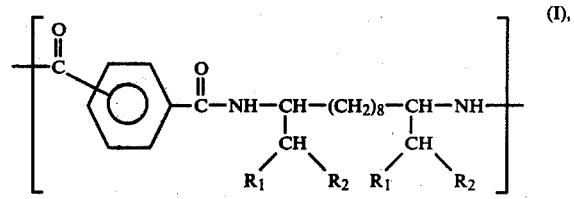

wherein the carbonyl groups are in the 1,3- or 1,4-position to one another (the proportion of carbonyl groups in the 1,3-position being 30 to 100%) and each of $R_1$ and $R_2$ is methyl or $R_1$ and $R_2$ together with the carbon atom to which they are attached are cycloalkyl of 4 to 6 carbon atoms, or of (b) recurring structural units of the formula (II)

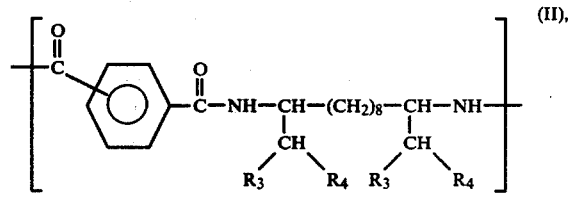

wherein the carbonyl groups are in the 1,3- or 1,4-position to one another (the proportion of carbonyl groups in the 1,3-position being 30 to 50%) and $R_3$ and $R_4$ are alkyl, or of (c) recurring structural units of the formula (V)

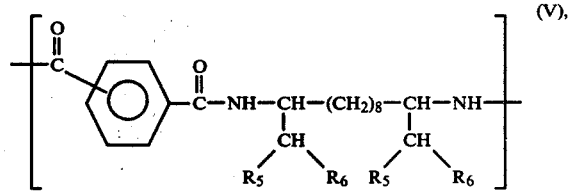

wherein the carbonyl groups are either exclusively in the 1,3-position or exclusively in the 1,4-position to one another or partly in the 1,3-position and partly in the 1,4-position, and wherein $R_5$ and $R_6$ together with the carbon atom to which they are attached are cycloalkyl of 7 to 12 carbon atoms.

The polyamides are suitable for the production of transparent moulded articles.

9 Claims, No Drawings

TRANSPARENT POLYAMIDES FROM BRANCHED CHAIN DIAMINE

The present invention relates to novel transparent polyamides, a process for their production and the use thereof for the manufacture of transparent moulded articles.

German patent specification No. 745,029 describes a process for the production of polyamides of higher molecular weight, wherein primary or secondary aliphatic or aromatic aminocarboxylic acid nitriles, or mixtures of an aliphatic or aromatic dinitrile and approximately equivalent amounts of a primary or secondary diamine, are heated to temperatures of about 150° to 300° C., under pressure, in the presence of water. A suitable diamine, there is mentioned, inter alia, 1,10-diamino-1,10-dimethyldecane. According to French patent specification 867,384, formamides, for example N,N-diformyl-1,10-dimethyl-1,10-diaminodecane, can also be used as polycondensation components for the production of polyamides. Finally, German Offenlegungsschrift No. 1,720,513 discloses generically boil-proof transparent polyamides obtained from aromatic dicarboxylic acids and unsubstituted or alkyl-substituted alkylenediamines containing 1 to 10 carbon atoms in the chain, which are substituted at at least one of the two terminal carbon atoms by an alkyl group of 1 to 4 carbon atoms. The specific disclosure of this Offenlegungsschrift, however, is restricted to transparent polyamides obtained from aromatic dicarboxylic acids and alkylenediamines of the kind mentioned above containing not more than 7 carbon atoms in the chain. Polyamides obtained from aromatic dicarboxylic acids or derivatives thereof and 1,10-dialkyl-substituted 1,10-diaminodecanes are also not specifically described in the other previously mentioned references.

The polyamides obtained from aromatic dicarboxylic acids, such as terephthalic acid and derivatives thereof, and longer chain, unsubstituted or alkyl-substituted diamines, and which are known from this prior art literature, as well as the condensation product of terephthalic acid and an isomeric mixture of 2,2,4- and 2,4,4-trimethylhexamethylenediamine, known under the registered trade name of "Trogamid T", are not entirely satisfactory as regards water absorption, resistance to hydrolysis and/or dimensional stability under the influence of moisture, whereby the mechanical and electrical properties of these polyamides are also impaired.

Accordingly, it is the object of the present invention to provide novel transparent and boil-proof polyamides having a lower water absorption, increased resistance to hydrolysis, good dimensional stability under the influence of moisture and correspondingly improved mechanical and, in particular, electrical properties.

The novel polyamides of the invention have a reduced specific viscosity of at least 0.4 dl/g and preferably of 0.4 to about 3 dl/g, and in particular of about 0.6 to about 2 dl/g, measured as a 0.5% solution of the polyamide in m-cresol at 25° C., and consist either of (a) recurring structural units of the formula I

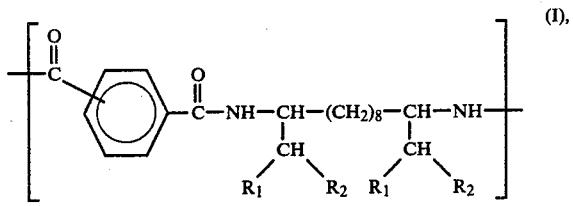

wherein the carbonyl groups are bonded to the benzene ring in the 1,3- or 1,4-position, each of $R_1$ and $R_2$ represents methyl or $R_1$ and $R_2$, together with the carbon atom to which they are attached, represent cycloalkyl of 4 to 6 carbon atoms, and the proportion of structural units of the formula (I) in which the carbonyl groups are bonded in the 1,3-position to the benzene ring is 30 to 100%, or of (b) recurring structural units of the formula (II)

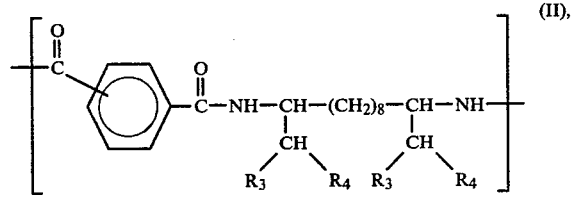

wherein the carbonyl groups are bonded in the 1,3- or 1,4-position to the benzene ring, $R_3$ represents alkyl of 2 to 8 carbon atoms and $R_4$ represents alkyl of 1 to 4 carbon atoms, and wherein the proportion of structural units of the formula (II) in which the carbonyl groups are bonded to the benzene ring in the 1,3-position is 30 to 50%, or of (c) recurring structural units of the formula (V)

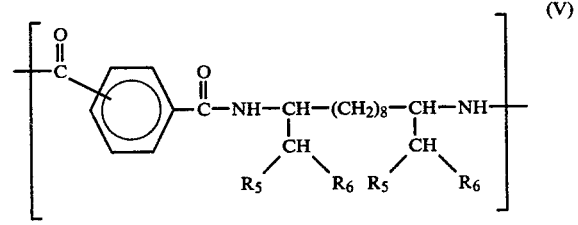

wherein the carbonyl groups are bonded to the benzene ring either exclusively in the 1,3-position or exclusively in the 1,4-position or else in any ratio partly in the 1,3-position and partly in the 1,4-position, and in which $R_5$ and $R_6$, together with the carbon atom to which they are attached, represent cycloalkyl of 7 to 12, preferably 7 or 8, carbon atoms.

Alkyl groups represented by $R_3$ or $R_4$ can be straight chain or branched. Examples of such alkyl groups are: the methyl, ethyl, n-propyl, isopropyl, n-butyl, sec-butyl, n-pentyl, n-hexyl, n-heptyl and n-octyl group.

A cycloalkyl ring formed by $R_1$ and $R_2$ together with the carbon atom to which they are attached is the cyclobutyl, cyclopentyl or cyclohexyl ring.

Preferred polyamides are those which consist of recurring structural units of the formula (I), wherein $R_1$ and $R_2$ together with the carbon atom to which they are attached represent cyclopentyl or cyclohexyl, and those which consist of structural units of the formula (II), wherein the proportion of structural units of the formula (II) in which the carbonyl groups are bonded in the 1,3-position to the benzene ring is 50%, $R_3$ represents alkyl of 2 to 4 carbon atoms and $R_4$ represents methyl or ethyl.

Particularly preferred polyamides are those which consist of recurring structural units of the formula (I), wherein each of $R_1$ and $R_2$ represent methyl and wherein the proportion of structural units of the formula (I) in which the carbonyl groups are bonded in the 1,3-position to the benzene ring is at least 40%.

A further preferred embodiment of the invention comprises those polyamides which consist of recurring structural units of the formula (I), wherein $R_1$ and $R_2$, together with the carbon atom to which they are attached, represent cyclohexyl and wherein the proportion of structural units of the formula (I) in which the carbonyl groups are bonded in the 1,3-position to the benzene ring is 30%.

Yet another preferred embodiment of the invention comprises those polyamides which consist of recurring structural units of the formula (II), wherein each of $R_3$ and $R_4$ represents ethyl and wherein the proportion of structural units of the formula (II) in which the carbonyl groups are bonded in the 1,3-position to the benzene ring is 30%.

A still further preferred embodiment of the invention comprises those polyamides which consist of recurring structural units of the formula (V), wherein $R_5$ and $R_6$ together with the carbon atom to which they are attached represent cyclooctyl and wherein the proportion of structural units of the formula (V) in which the carbonyl groups are bonded in the 1,4-position to the benzene ring is 70 to 100%.

The polyamides of the present invention can be obtained by (a) reacting isophthalic acid or an amide-forming derivative thereof and, if desired, terephthalic acid or an amide-forming derivative thereof, with substantially stoichiometric amounts of a diamine of the formula (III)

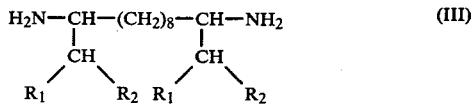

wherein $R_1$ and $R_2$ are as defined in formula (I), and the weight ratio of isophthalic acid to terephthalic acid, or of the corresponding amide-forming derivatives to each other if they contain the same functional groups, is 3:7 to 10:0, or (b) reacting a mixture of isophthalic acid or an amide-forming derivative thereof and terephthalic acid or an amide-forming derivative thereof, with substantially stoichiometric amounts of a diamine of the formula (V)

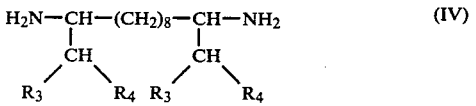

wherein $R_3$ and $R_4$ are as defined in formula (II) and the weight ratio of isophthalic acid to terephthalic acid, or of the corresponding amide-forming groups to each other if they contain the same functional groups, is 3:7 to 5:5, or (c) reacting isophthalic acid or an amide-forming derivative thereof, or any mixture of isophthalic and terephthalic acid and/or corresponding amide-forming derivatives, with substantially stoichiometric amounts of a diamine of the formula (VI)

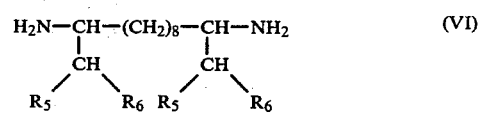

wherein $R_5$ and $R_6$ are as defined in formula (V).

As amide-forming derivatives of isophthalic acid or terephthalic acid there can be used for example the corresponding dihalides, especially the dichlorides, dinitriles, dialkyl or diaryl esters, in particular dialkyl esters containing 1 to 4 carbon atoms in each of the alkyl moieties, and, especially, diphenyl esters.

The reaction of isophthalic acid and, if desired, terephthalic acid, or of the amide-forming derivatives thereof, with the diamines of the formulae (II), (IV) and (VI), can be carried out by methods which are in themselves known.

The polyamides of the invention are preferably obtained by the melt polycondensation process in several steps. In this process, the reactants in the given ratios, preferably salts of isophthalic acid and, if desired, terephthalic acid, and diamine of the formula (III) or salts of isophthalic acid and terephthalic acid and diamine of the formula (IV), or salts of isophthalic acid and terephthalic acid and diamine of the formula (VI), are precondensed under pressure at temperatures between about 220° C. and 300° C. in the melt, advantageously in an inert gas atmosphere, such as nitrogen. The salts to be used for the precondensation are conveniently prepared individually from substantially stoichiometric amounts of isophthalic acid or terephthalic acid and diamine of the formula (III), (IV) or (VI) in suitable inert organic solvents. Suitable inert organic solvents are for example cycloaliphatic alcohols, such as cyclopentanol and cyclohexanol, and, in particular, aliphatic alcohols containing not more than 6 carbon atoms, such as methanol, ethanol, n-propanol, butanols, pentanols and hexanols, and also mixtures of such solvents with water. The precondensate can subsequently be further condensed at temperatures between about 220° and 300° C. under normal pressure, and advantageously also in an inert gas atmosphere, until the formation of the polyamides. In some cases it can be of advantage to apply a vacuum when the polycondensation is complete, in order to degas the polyamide.

The polyamides of the invention can also be obtained by melt polycondensation of diamines of the formula (III), (IV) or (VI) with substantially stoichiometric amounts of an activated ester of isophthalic acid and, if desired, of terephthalic acid. Suitable activated esters are in particular the corresponding diphenyl esters.

The reaction temperatures are in general in the range between about 230° and 300° C.

Finally, the polyamides of the invention can also be obtained in a manner which is in itself known by solvent or interfacial polycondensation.

The diamines of the formulae (III), (IV) and (VI) are known or they can be prepared by methods which are in themselves known, for example by catalytic hydrogenation of 1,2-diaza-1,5,9-cyclododecatrienes or 1,2-diaza-cyclododecanes, which are correspondingly substituted in the 3,12-position, in the presence of an inert organic solvent.

The polyamides of the present invention have a crystal clear appearance, are resistant to boiling water and are distinguished in particular by low water absorption, excellent resistance to hydrolysis and/or good dimensional stability under the influence of moisture, allied to improved mechanical and especially electrical properties. The polyamides can be processed to transparent moulded articles of the most diverse kind by methods which are in themselves known, for example by injection moulding or extrusion. In particular, they are suitable for manufacturing from the melt utensils or parts of utensils which are resistant to boiling water.

The invention is illustrated by the following Examples.

EXAMPLE 1

118.3 g of 3,12-diamino-2,13-dimethyltetradecane are dissolved in 1500 ml of ethanol in a beaker equipped with a stirrer and the solution is heated to 50° C. To this solution are added, in one portion, 76.6 g of isophthalic acid, followed by the addition of 300 ml of ethanol. A solution is formed with attendant exothermic reaction. On cooling, the salt precipitates from the reaction mixture. It is collected by filtration and dried in vacuo at 90° C. Yield: 158 g (81% of theory). 10 g of this salt are fused under nitrogen in a bomb tube and heated for 3 hours to 280° C. The resulting condensate is then polycondensed for 8 hours at 280° C. in a condensation tube under normal pressure and while introducing nitrogen. On cooling, the melt solidifies to a crystal clear mass. The reduced specific viscosity of the resulting polyamide (0.5% solution of the polyamide in m-cresol at 25° C.) is 0.76 dl/g; glass transition temperature determined by differential thermoanalysis=139° C. The polyamide is pressed at 270° C. to a sheet using an electrically heated hydraulic press. The sheet is stored at room temperature (20° C. to 25° C.) and 65% relative humidity. After 1 week, the sheet has absorbed 0.9% by weight of water. No more water is absorbed even after prolonged storage.

EXAMPLE 2

A flask equipped with stirrer, drip funnel and reflux cooler is charged with 74.9 g of terephthalic acid together with 800 ml of water and 2000 ml of ethanol and the mixture is heated to 50° C. Then 116.6 g of 3,12-diamino-2,13-dimethyltetradecane are added from the drip funnel and the flask is flushed with 1500 ml of ethanol. The reaction mixture is heated to 80° C., whereupon a solution is formed. The reaction solution is then cooled to 5° C., whereupon the salt precipitates. The salt is collected by filtration and dried in vacuo at 90° C.

Yield: 16.2 g (85% of theory).

6 g of this salt are mixed with 4 g of the salt obtained in Example 1 and condensed as described therein, yielding a polyamide with a reduced specific viscosity (0.5% solution of the polyamide in m-cresol at 25° C.) of 0.86 dl/g; glass transition temperature=144° C.

A sheet is prepared from the above copolyamide as described in Example 1 and stored for 1 week at room temperature and 65% relative humidity. The water absorption after this time is 0.9% by weight.

EXAMPLE 3

12.27 g of isophthalic acid are dissolved in 380 ml of boiling ethanol. Then 25 g of 1,10-diamino-1,10-dicyclohexyldecane are added in one portion and the reaction vessel is then rinsed with 75 ml of ethanol. The salt precipitates after a few seconds. The reaction mixture is cooled to 0° C. and the salt is collected by filtration and dried in vacuo at 100° C. Yield: 36.1 g (97% of theory).

10 g of this salt are polycondensed as described in Example 1 and the resulting polyamide is processed to a transparent sheet. The reduced specific viscosity is 0.63 dl/g; glass transition temperature=152° C. The water absorption is 0.9% by weight after storage for 1 week at room temperature and 65% relative humidity. The reduced specific viscosity and glass transition temperature were determined as described in Example 1.

EXAMPLE 4

11.72 g of terephthalic acid in a mixture of 250 ml of ethanol and 90 ml of water are heated to reflux temperature in a reaction vessel equipped with stirrer, reflux cooler and drip funnel, and then 24 g of 1,10-diamino-1,10-dicyclohexyldecane are added dropwise from the drip funnel. The reaction mixture is stirred for 48 hours under reflus, then cooled to room temperature (20° to 25° C.). The resulting salt is collected by filtration and dried in vacuo at 100° C. Yield: 34.8 (98% of theory).

7 g of this salt are mixed with 3 g of the salt obtained in Example 3 and polycondensed in the manner described therein. A sheet prepared from the resulting polyamide has the following properties (determined as indicated in Example 1): reduced specific viscosity 0.60 dl/g; glass transition temperature=163° C.; water absorption 0.8% by weight after storage for 1 week at room temperature and 65% relative humidity.

EXAMPLE 5

4.73 g of 1,10-diamino-1,10-dicyclopentyldecane and 4.83 g of diphenyl isophthalate are fused together under nitrogen and heated to 210° C. After 3 hours the temperature is raised to 270° C. and a weak flow of nitrogen is passed through the melt. The bulk of the phenol which has formed is distilled off in the course of 3 hours. Remaining phenol is removed by reducing the pressure to about 1 torr. After 3 hours, the polycondensation is discontinued and the melt is cooled, whereupon it solidifies to a crystal clear mass.

A sheet prepared from the melt at 250° C. has the following properties (determination as indicated in Example 1): reduced specific viscosity 0.68 dl/g; glass transition temperature=143° C.; water absorption 0.9% by weight after storage for 1 week at room temperature and 65% relative humidity.

EXAMPLE 6

Salt 1: A 1 liter Erlenmeyer flask equipped with magnetic stirrer and reflux cooler is charged with 16.61 g of terephthalic acid and a mixture of 110 ml of water and 400 ml of ethanol. To the suspension are added, under reflux, 31.26 g of 5,14-diamino-4,15-dimethyloctadecane. The mixture is stirred for 5 hours at this temperature and the resulting white suspension is finally filtered at room temperature. The residue is dried at 90° C. in vacuo, affording 45.2 g of salt (94.3% of theory).

Salt 2: 16.61 g of isophthalic acid are suspended in 460 ml of ethanol in a liter glass beaker equipped with a flat paddle mixer. The suspension is then stirred at 75° C.

until all the acid is dissolved, whereupon 31.26 g of 5,14-diamino-4,15-dimethyloctadecane are introduced. The salt soon begins to precipitate. The white suspension is cooled to 0° C. and filtered after 30 minutes. The residue is dried in vacuo at 90° C., affording 44.1 g of salt (92% of theory). 7.5 g of salt 1 and 7.5 g of salt 2 are fused under nitrogen in a bomb tube and heated to 270° C. After 3 hours the melt is cooled and the solidified precondensate is removed from the bomb tube and transferred to a condensation tube equipped with a means for introducing nitrogen. The precondensate is fused under nitrogen at 270° C. and kept for 10 hours at this temperature while introducing nitrogen. On cooling, the melt solidifies to a crystal clear mass. The reduced specific viscosity of the resulting polyamide (determined in a 0.5% solution of the polyamide in m-cresol at 25° C.) is 0.88 dl/g. The glass transition temperature is 131° C. The water absorption is 0.5% by weight after storage for 1 week at room temperature and 65% relative humidity.

EXAMPLE 7

Salt 1: A 1 liter Erlenmeyer flask equipped with stirrer, drip funnel and reflux cooler is charged with 16.61 g of isophthalic acid and a mixture of 300 ml of water and 450 ml of ethanol and the charge is heated with stirring to 80° C. To the mixture are then added 36.86 g of 6,15-diamino-5,16-diethyleicosane from the drip funnel. The resulting mixture is then refluxed for about 5 hours and subsequently cooled to 5° C. The salt is collected by filtration and dried in vacuo at 90° C. Yield: 51.2 g (95.8% of theory).

Salt 2: A glass beaker equipped with stirrer is charged with 16.61 g of isophthalic acid and a mixture of 500 ml of ethanol and 100 ml of water. The acid is dissolved with stirring and simultaneous heating to 70° C. To the solution are then added 36.86 g of 6,15-diamino-5,16-diethyleicosane from the drip funnel, whereupon the salt immediately begins to precipitate. After stirring for 15 minutes at 70° to 75° C., the white suspension is cooled to 5° C. Stirring is then continued for 30 minutes and the salt is collected by filtration and dried in vacuo at 90° C. Yield: 50.8 g (95% of theory).

7.5 g of salt 1 and 7.5 g of salt 2 are fused under nitrogen in a bomb tube and heated to 270° C. After 3 hours the melt is cooled and the solidified precondensate is removed from the bomb tube and transferred to a condensation tube equipped with a means for introducing nitrogen. The precondensate is fused under nitrogen at 270° C. and kept for 10 hours at this temperature while introducing nitrogen. On cooling, the melt solidifies to a crystal clear mass. The reduced specific viscosity of the remaining polyamide determined in a 0.5% solution of the polyamide in m-cresol at 25° C.) is 0.73 dl/g. Glass transition temperature=124° C. The water absorption is 0.3% by weight after storage for 1 week at room temperature and 65% relative humidity.

EXAMPLE 8

In the same manner as described in Example 7, two salts are prepared from equivalent amounts of 4,13-diamino-3,14-dimethylhexadecane and terephthalic acid (salt 1) and isophthalic acid (salt 2) respectively. A mixture of 6 g of salt 1 and 4 g of salt 2 is polycondensed under the conditions described in Example 7 to a copolyamide, yielding a crystal clear product with a glass transition temperature of 140° C. and a reduced specific viscosity of 0.87 dl/g (0.5% solution of the polyamide in m-cresol at 25° C.). A sheet made of this material absorbs 0.7% of water at room temperature and 65% relative humidity.

EXAMPLE 9

Example 8 is repeated with the following modifications: 4,13-diamino-3,14-dimethylhexadecane is replaced by 4,13-diamino-3,14-diethylhexadecane and the ratio of terephthalic acid to isophthalic acid in the copolyamide is changed from 6:4 to 7:3.

The resulting copolyamide has the following properties:
glass transition temperature: 144° C.
reduced specific viscosity: 0.63 dl/g (0.5% solution of the polyamide
in m-cresol at 25° C.
water absorption: 0.5% by weight (65% relative humidity).

EXAMPLE 10

3.445 g of 1,10-diamino-1,10-dicyclooctyldecane and 2.776 g of diphenyl terephthalate are weighed into a flask equipped with distillation head and fused under nitrogen at 210° C. In the course of 5 hours the temperature is gradually raised to 280° C., while the bulk of the phenol set free during the condensation is distilled off.

A vacuum of about 0.1 torr is then applied for 2 hours in order to remove the phenol completely. On cooling, the polyamide solidifies to a colourless transparent mass having the following properties:
reduced specific viscosity: 0.86 dl/g
glass transition temperature: 178° C.
water absorption: 0.6% by weight at 65% relative humidity.

EXAMPLE 11

Following the same procedure as described in Example 10, 2.811 g of 1,10-diamino-1,10-dicyclooctyldecane and 2.265 g of isophthalic acid are polycondensed. The resulting polyamide has the following properties:
reduced specific viscosity: 0.72 dl/g
glass transition temperature: 141° C.
water absorption: 0.7% by weight at 65% relative humidity.

EXAMPLE 12

Following the same procedure as described in Example 10, 1.496 g of 1,10-diamino-1,10-dicycloheptyldecane and 1.281 g of diphenyl terephthalate are polycondensed. The resulting polyamide has the following properties:
reduced specific viscosity: 0.89 dl/g
glass transition temperature: 170° C.
water absorption: 0.8% by weight at 65% relative humidity.

EXAMPLE 13

Example 12 is repeated with the difference that diphenyl isophthalate is used instead of diphenyl terephthalate. The polyamide has the following properties:
reduced specific viscosity: 0.68 dl/g
glass transition temperature: 135° C.
water absorption: 0.9% by weight at 65% relative humidity.

The diamines used in Examples 1 to 13 can be prepared as follows:
(a) 3,12-Diamino-2,13-dimethyltetradecane 250 g (1 mole) of 3,12-diisopropyl-1,2-diaza-1,5,9-cyclododecatriene (diastereoisomer mixture) are dissolved in 1000 ml of tert -butanol in an agitator autoclave. After addition of 25 g of a rhodium/alumina catalyst (5% by weight of rhodium), hydrogen is introduced up to a pressure of 130 to 150 bar, whereupon hydrogenation is effected at 150° to 180° C. until the hydrogen uptake is complete. After cooling, excess hydrogen is blown off, the suspension is removed from the autoclave by suction and the catalyst is filtered off with suction over a small amount of hyflo (filter aid). The filtrate is concentrated by rotary evaporation and the product is purified by distillation, affording as main fraction 238 g (92% of theory) of 3,12-diamino-2,13-dimethyltetradecane as a colourless oil [b.p. 106°–109° C./0.01 torr; $n_D^{20}=1.4600$; IR spectrum (in liquid) includes bands at 3355, 3278, 1613 cm$^{-1}$].

(b) 5,14-Diamino-4,15-dimethyloctadecane

The procedure described in (a) is repeated, starting from 61 g (0.2 mole) of 3,12-di-(2-pentyl)-1,2-diaza-1,5,9-cyclododecatriene (diastereoisomer mixture) and using correspondingly reduced amounts of catalyst and solvent. The main fraction consists of 48.4 g (77% of theory) of 5,14-diamino-4,15-dimethyloctadecane as a colourless oil [b.p. 155°–159° C./0.03 torr; $n_D^{20}=1.4632$; IR spectrum (liquid) includes bands at 3246, 1613 cm$^{-1}$].

(c) 1,10-Diamino-1,10-dicyclopentyldecane

The procedure described in (a) is repeated, starting from 200 g (0.666 mole) of crude 3,12-dicyclopentyl-1,2-diaza-1,5,9-cyclododecatriene (diastereoisomer mixture) and using correspondingly reduced amounts of catalyst and solvent, affording after purification by chromatography and distillation 39.2 g (19% of theory) of 1,10-diamino-1,10-dicyclopentyl-decane as a colourless oil [b.p. 174°–178° C./0.002 torr; $n_D^{20}=1.4885$; IR spectrum (liquid) includes bands at 3355, 3278, 1613$^{-1}$].

(d) 1,10-Diamino-1,10-dicyclohexyldecane

The procedure described in (a) is repeated, starting from 328.5 g (1 mole) of 3,12-dicyclohexyl-1,2-diaza-1,5,9-cyclododecatriene (diastereoisomer mixture) and using correspondingly reduced amounts of catalyst and solvent. The main fraction obtained consists of 304 g (90% of theory) of 1,10-diamino-1,10-dicyclohexyldecane as a colourless oil [b.p. 190°–193° C./0.05 torr; $n_D^{20}=1.4944$; IR spectrum (liquid) includes bands at 3355, 3278, 1613 cm$^{-1}$].

(e) 6,15-Diamino-5,16-diethyleicosane

The procedure described in (a) is repeated, starting from 74.8 g (0.2 mole) of 3,12-di-(3-heptyl)-1,2-diazacyclododecane (diastereoisomer mixture) and using correspondingly reduced amounts of catalyst and solvent, affording after purification by chromatography and distillation 29.9 g (40% of theory) of 6,15-diamino-5,16-diethyleicosane as a colourless oil [b.p. 170° C./0.01 torr; $n_D^{20}=1.4662$; IR spectrum (liquid) includes bands at 3278, 1613 cm$^{-1}$]. The 1,2-diaza-1,5,9-cyclododecatrienes and 1,2-diazacyclododecanes used as starting materials can be prepared by the methods described in German Offenlegungsschrift Nos. 2,330,087 and 2,549,403.

(f) 4,13-Diamino-3,14-dimethylhexadecane

The procedure described in (a) is repeated, starting from 87.3 g (0.31 mole) of 3,12-di-(2-butyl)-1,2-diaza-1,5,9-cyclododecatriene (diastereoisomer mixture) and using correspondingly reduced amounts of catalyst and solvent, affording as main fraction 74.7 g (85% of theory) of 4,13-diamino-3,14-dimethylhexadecane as a colourless oil [b.p. 143° to 145° C./0.05 torr; $n_D^{20}=1.4639$; IR spectrum (liquid) includes bands at 3330, 1626 cm$^{-1}$].

(g) 4,13-Diamino-3,14-diethylhexadecane

The procedure described in (a) is repeated, starting from 49 g (0.16 mole) of 3,12-di-(3-pentyl)-1,2-diazacyclododecane and using correspondingly reduced amounts of catalyst and solvent, affording after purification by chromatography 37.5 g (75% of theory) of 4,13-diamino-3,14-diethylhexadecane as a colourless oil [$n_D^{20}=1.4664$; IR spectrum (liquid) includes bands at 3330, 1626 cm$^{-1}$].

(h) 1,10-Diamino-1,10-dicycloheptyldecane

The procedure described in (a) is repeated, starting from 106 g (0.3 mole) of 3,12-dicycloheptyl-1,2-diaza-1,5,9-cyclododecatriene (diastereoisomer mixture) and using correspondingly reduced amounts of catalyst and solvent, affording after purification by chromatography 63 g (58% of theory) of 1,10-diamino-1,10-dicycloheptyldecane as a colourless oil [$n_D^{20}=1.5018$; IR spectrum (liquid) includes bands at 3390, 3310, 3618 cm$^{-1}$].

(i) 1,10-Diamino-1,10-dicyclooctyldecane

The procedure described in (a) is repeated, starting from 65 g (0.168 mole) of 3,12-dicyclooctyl-1,2-diazacyclododecane and using correspondingly reduced amounts of catalyst and solvent, affording after purification by chromatography 43.6 g (66% of theory) of 1,10-diamino-1,10-dicyclooctyldecane as a colourless oil [$n_D^{20}=1.5050$; IR spectrum (liquid) includes bands at 3333, 3278, 1613 cm$^{-1}$].

The 1,2-diaza-1,5,9-cyclododecatrienes and 1,2-diazacyclododecanes used as starting materials are prepared by the process described in German Offenlegungsschrift No. 2,330,097.

What is claimed is:

1. A transparent polyamide having a reduced specific viscosity of 0.4 to about 3 dl/g, determined in a 0.5% solution of the polyamide in m-cresol at 25° C., and consisting either of (a) recurring structural units of the formula (I)

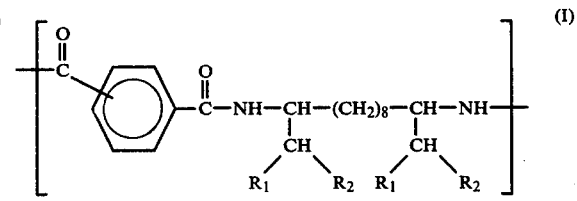

wherein the carbonyl groups are bonded to the benzene ring in the 1,3- or 1,4-position, each of $R_1$ and $R_2$ represents methyl or $R_1$ and $R_2$, together with the carbon atom to which they are attached, represent cycloalkyl of 4 to 6 carbon atoms, and the proportion of structural units of the formula (I) in which the carbonyl groups are bonded in the 1,3-position to the benzene ring is 30 to 100%, or of (b) recurring structural units of the formula (II)

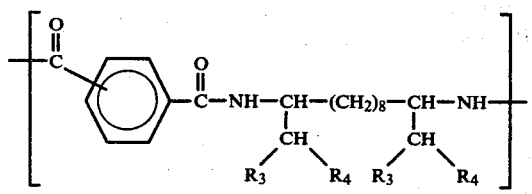

wherein the carbonyl groups are bonded in the 1,3- or 1,4-position to the benzene ring, $R_3$ represents alkyl of 2 to 8 carbon atoms and $R_4$ represents alkyl or 1 to 4 carbon atoms, and wherein the proportion of structural units of the formula (II) in which the carbonyl groups are bonded to the benzene ring in the 1,3-position is 30 to 50%, or of (c) recurring structural units of the formula (V)

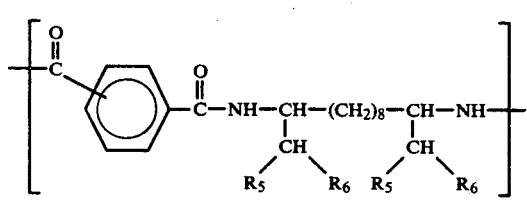

wherein the carbonyl groups are bonded to the benzene ring either exclusively in the 1,3-position or exclusively in the 1,4-position or partly in the 1,3-position and partly in the 1,4-position, and in which $R_5$ and $R_6$, together with the carbon atom to which they are attached, represent cycloalkyl of 7 to 12 carbon atoms.

2. A polyamide according to claim 1 which consists of recurring structural units of the formula (I), wherein $R_1$ and $R_2$, together with the carbon atom to which they are attached, represent cyclopentyl or cyclohexyl.

3. A polyamide according to claim 1 which consists of recurring structural units of the formula (I), wherein each of $R_1$ and $R_2$ represents methyl and wherein the proportion of structural elements of the formula (I) in which the carbonyl groups are bonded in the 1,3-position to the benzene ring is at least 40%.

4. A polyamide according to claim 1 which consists of recurring structural units of the formula (I), wherein $R_1$ and $R_2$, together with the carbon atom to which they are attached, represent cyclohexyl and wherein the proportion of structural units of the formula (I) in which the carbonyl groups are bonded in the 1,3-position to the benzene ring is 30%.

5. A polyamide according to claim 1 which consists of recurring structural units of the formula (II), wherein the proportion of structural units of the formula (II) in which the carbonyl groups are bonded in the 1,3-position to the benzene ring is 50%, $R_3$ represents alkyl of 2 to 4 carbon atoms and $R_4$ represents methyl or ethyl.

6. A polyamide according to claim 1 which consists of recurring structural units of the formula (II), wherein each of $R_3$ and $R_4$ represents ethyl and wherein the proportion of structural units of the formula (II) in which the carbonyl groups are bonded in the 1,3-position to the benzene ring is 30%.

7. A polyamide according to claim 1 which consists of recurring structural units of the formula (V), wherein $R_5$ and $R_6$, together with the carbon atom to which they are attached, represent cyclooctyl, and wherein the proportion of structural units of the formula (V) in which the carbonyl groups are bonded in the 1,4-position to the benzene ring is 70 to 100%.

8. A polyamide according to claim 1 having recurring structural units of formula V in which $R_5$ and $R_6$, together with the carbon atom to which they are attached, represent cycloalkyl of 7 or 8 carbon atoms.

9. A transparent molded article of the polyamide according to claim 1.